United States Patent [19]

Kohayakawa

[11] Patent Number: 5,231,460
[45] Date of Patent: Jul. 27, 1993

[54] AUTOMATIC LENS METER

[75] Inventor: Yoshimi Kohayakawa, Yokohama, Japan

[73] Assignee: Canon Kabushiki Kaisha, Tokyo, Japan

[21] Appl. No.: 770,897

[22] Filed: Oct. 4, 1991

[30] Foreign Application Priority Data

Oct. 16, 1990 [JP] Japan ................... 2-276764

[51] Int. Cl.$^5$ ................................ G01B 9/00
[52] U.S. Cl. ........................ 356/125; 356/127
[58] Field of Search ............. 356/124, 125, 126, 127

[56] References Cited

U.S. PATENT DOCUMENTS

| 4,534,645 | 8/1985  | Nohda       | 356/125 |
| 4,609,287 | 9/1986  | Kohayakawa  | 356/124 |
| 4,730,924 | 3/1988  | Allard et al. | 356/124 |
| 4,779,979 | 10/1988 | Iwane       | 356/125 |
| 4,826,315 | 5/1989  | Kohayakawa  | 356/125 |

Primary Examiner—Richard A. Rosenberger
Assistant Examiner—Hoa Q. Pham
Attorney, Agent, or Firm—Fitzpatrick, Cella, Harper & Scinto

[57] ABSTRACT

An automatic lens meter includes a projection optical system for projecting light beams onto a lens to be tested. The lens is held at a predetermined position in the direction of an optical axis. The meter also includes a receiving optical system having a light position detector. The receiving optical system receives light beams transmitted through the lens to be tested on the light-position detector. The meter further includes a calculator for calculating a diopter value and an eccentricity of the lens to be tested from the position of the tranmitted light beams on the light-position detector, a timer for measuring the time during which the eccentricity is within a predetermined range, and a display device for displaying the diopter value of the lens to be tested when the time during which the eccentricity is within a predetermined range exceeds a predetermined time.

11 Claims, 1 Drawing Sheet

AUTOMATIC LENS METER

BACKGROUND OF THE INVENTION

1. Field of the Invention

This invention relates to an automatic lens meter which is used for the measurement of diopter values of spectacle lenses in an ophthalmic hospital, or by an optician.

2. Description of the Prior Art

In a conventional automatic lens meter, after positioning a spectacle lens with respect to the meter while holding the lens with one's hands, the tester fixes the lens using a fixation device, and performs a measurement of the diopter value of the lens by depressing a measurement button.

The above-described conventional method, however, has the disadvantage that operability is inferior, mainly because the lens tends to move when fixing the lens using the fixation device.

SUMMARY OF THE INVENTION

It is an object of the present invention to solve the above-described problems.

It is another object of the present invention to provide an automatic lens meter having excellent operability which can perform highly-accurate measurement of a diopter value of a lens while holding the lens with one's hands.

According to one aspect of the present invention which achieves these objectives, there is an automatic lens meter comprising a projection optical system for projecting light beams onto a lens to be tested held at a predetermined position in the direction of an optical axis, a receiving optical system comprising a light position detector, the receiving optical system receiving light beams transmitted through the lens to be tested on the light-position detector, a calculation means for calculating the diopter value and the eccentricity of the lens to be tested from the position of the transmitted light beams on the light-position detector, a time measuring means for measuring the time during which the eccentricity is within a predetermined range, and a display means for displaying the diopter value of the lens to be tested calculated from the position of the light beams on the light-position detector when the time during which the eccentricity is within a predetermined range exceeds a predetermined time, the calculation means calculating a plurality of measured data for each of the diopter values and the eccentricity of the lens to be tested. The display means displays an average value of the plurality of measured data. The calculation means calculates a plurality of measured data for the eccentricity of the lens to be tested, and a single measured data for the diopter value of the lens to be tested after the lapse of the predetermined time. The display means displays the calculated diopter value further comprising means for indicating to an operator the completion of the measurement. The indicating means comprises sound generation means for generating a sound. The lens to be tested comprises a progressive multifocal lens. The calculation means calculates diopter values for a far-sight position and a near-sight position of a progressive multifocal lens further comprising a switch connected to the calculation means, wherein the switch is closed the calculation means starts calculating the diopter value of the lens to be tested when the time during which the eccentricity is within a predetermined range does not reach the predetermined time. The calculation means calculates the eccentricity and the diopter value based on light beams from the same light source.

DETAILED DESCRIPTION OF THE PREFERRED EMBODIMENT

The preferred embodiment of the present invention will now be explained in detail with reference to the drawings.

Figure 1:
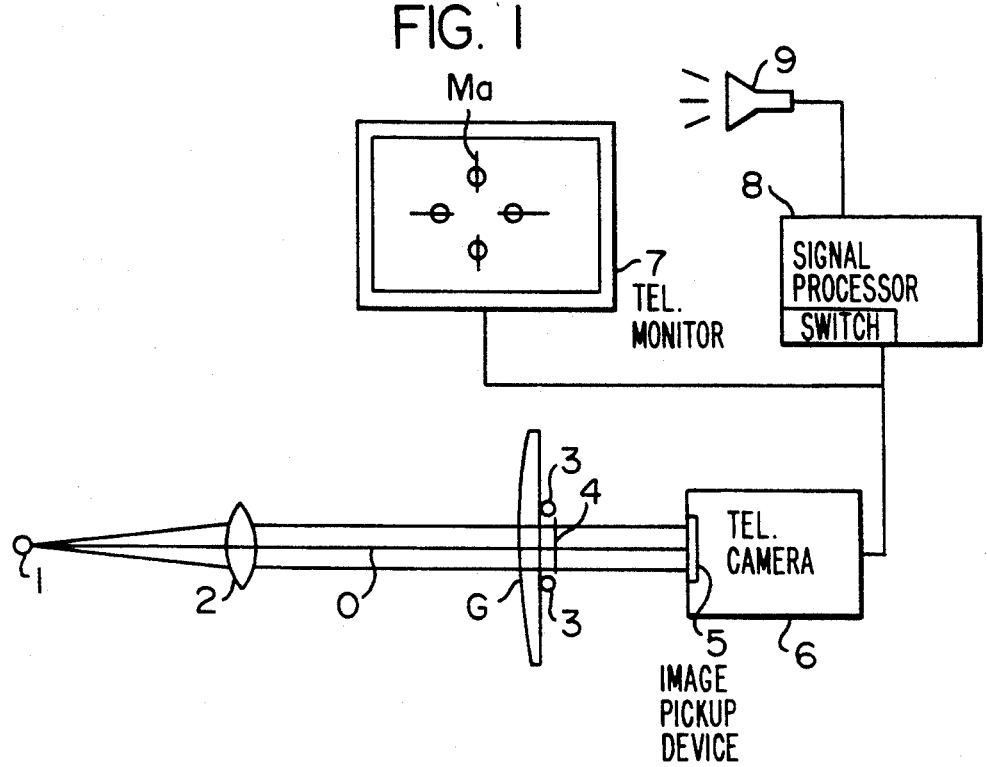
FIG. 1 is a schematic block diagram illustrating the configuration of an automatic lens meter according to an embodiment of the present invention.
Figure 2:
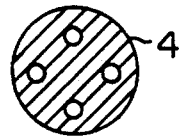
FIG. 2 is a front view of a four-aperture diaphragm shown in FIG. 1.

FIG. 1 illustrates the configuration of an automatic lens meter according to the preferred embodiment of the present invention. In FIG. 1, on an optical path O of a point-like light source 1, there are sequentially disposed from the light source 1, a lens 2, a contact member 3 for contacting a lens G to be tested in the direction of the optical axis, a four-aperture diaphragm 4 having four apertures as shown in FIG. 2, and a two-dimensional image pickup device 5, such as a CCD (charge-coupled device) or the like. The output from the image pickup device 5 is connected to a television camera 6, whose output is connected to a television monitor 7, and a signal processor 8 comprising a computer, a memory and the like. The output from the signal processor 8 is connected to a speaker 9.

In a state wherein the lens G to be tested is in contact with the contact member 3 while being held with the hands of the tester, a light beam from the light source 1 is made to be a parallel light beam by the lens 2, and is projected onto the lens G to be tested. The light beam passing through the lens G passes through the apertures of the four-aperture diaphragm 4. Four aperture light beams are received by the image pickup device 5, and are converted into video signals by the television camera 6. The video signals representing the aperture light beams are electrically synthesized with alignment marks Ma. The synthesized video signals are displayed on the television monitor 7, and are at the same time received in the signal processor 8 in the form of digital values.

Whether or not the lens G to be tested is present on the measuring optical path is determined according to whether or not the aperture light beams are present at positions different from positions of the aperture light beams on the image pickup device 5 when the lens G to be tested is not present on the measuring optical path.

The eccentricity and diopter value of the lens G is calculated from the positions of the aperture light beams. That is, by considering the position of the center of gravity of the four aperture light beams on the image pickup device 5 when the lens G is not present on the measuring optical path a reference position, the amount of deviation of the position of the center of gravity of the four aperture light beams from the above-described reference position when the lens G is present on the measuring optical path is calculated as the eccentricity of the lens G to be tested. The diopter value of the lens G to be tested is calculated from the shape of a general ellipse connecting at least three of the four aperture light beams.

While observing the degree of coincidence of the aperture light beams and the alignment marks Ma on the television monitor 7, the tester positions the lens G so that the optical axis of the lens G coincides with the measuring optical axis, that is, the eccentricity is within a permissible range. During that operation, the eccentricity and the diopter value are always calculated within the signal processor 8. A timer provided within the signal processor 8 measures the time during which the eccentricity is within a predetermined range. When the eccentricity remains within the permissible range during a predetermined time period, for example, about 0.5 seconds, the diopter value and the eccentricity within the predetermined time period is stored within the memory of the signal processor 8. Measured data are received, for example, 2–5 times during 0.5 seconds, or once after the lapse of 0.5 seconds. When a plurality of measured data are received, the average value of the plurality of measured data is adopted as the measured value by the signal processor 8. After the lapse of the predetermined time period, the signal processor 8 displays the calculated diopter value on the monitor 7, or prints the value on a printer. After the completion of the measurement, i.e., after calculation and display of the diopter value, the speaker 9 generates an electronic sound to notify the tester of this fact.

The above-described automatic measurement, however, has the following problem. That is, if the lens G to be tested includes a prism, the position of the center of gravity of the four aperture light beams on the image pickup device 5 greatly deviates from the above-described reference position, and the eccentricity exceeds the permissible range. Hence, measurement is not started even if the lens G is at the predetermined position. Accordingly, it is desirable to arrange the meter so as to be able to start measurement of the eccentricity and the diopter of the lens by operating a measurement start button, as in the conventional meter.

The indication of the completion of measurement may be made not by the speaker 9, but by being visually displayed on the television monitor 7. Although there is the possibility that the optical axis of the lens G to be tested accidentally coincides with the optical axis of the measuring system by the operation of the tester before the lens G contacts the contact member 3 in the direction of the optical axis, the coincidence occurs for an extremely short time period, and therefore the measured value is not received.

A one-dimensional image pickup device may be used as the image pickup device 5, and the positions of the light beams may be obtained by mechanically moving the one-dimensional image pickup device. Furthermore, in order to more simply calculate the eccentricity, a light source and a photoelectric sensor for alignment may be provided separated from the light source 1 and the image pickup device 5 for measuring diopter values.

Figure 3:
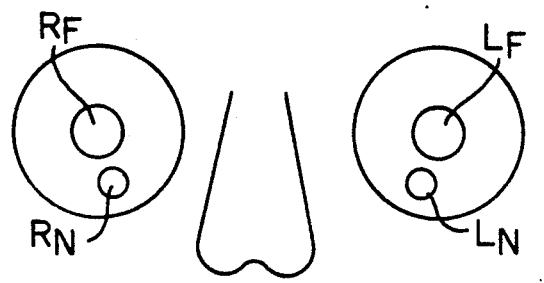
FIG. 3 is a schematic view illustrating progressive multifocal lenses.

In the case of using progressive multifocal lenses, as shown in FIG. 3, left and right lenses generally have a spherical shape (including the shape of an ellipsoid) at far-sight positions (portions near the respective optical axes) $L_F$ and $R_F$, and near-sight positions (portions surrounding the respective optical axes) $L_N$ and $R_N$, and an aspherical shape at positions other than the positions $L_F$, $L_N$, $R_F$ and $R_N$.

In order to measure the additional power (the difference in the degree of sphericity between the far-sight position and the near-sight position) of a progressive multifocal lens, an additional-power measurement button (not shown) is provided and depressed. As a result, first, measuring light beams are projected onto the far-sight position near the optical axis, and the degree of sphericalness at the far-sight position is measured in the above-described aligned state. Subsequently, the lens is shifted in a direction perpendicular to the optical axis, the measuring light beams are projected onto the near-sight position using a method of alignment to be described later, and the difference in astigmatism (to be described later) or the deviation from a toric shape is monitored. If the value is within a predetermined range for at least a predetermined time, data are received, and the measurement is terminated.

In a first method, serving as the above-described method of alignment at the near-sight position, the axis of astigmatism and the degree of astigmatism at the far-sight position calculated by the signal processor 8 using three of four aperture light beams passing through the four apertures provided in the vertical and horizontal directions shown in FIG. 2 are stored in the memory of the signal processor 8, and the calculated values of the axis of astigmatism and the degree of astigmatism at the near-sight position are arranged by the signal processor 8 so as to have approximately the same values as the stored values at the far-sight position.

In a second method, the four aperture light beams passing through the four apertures in the vertical and horizontal directions shown in FIG. 2 are arranged by the signal processor 8 to be on the same circumference or the same ellipse on the sensor.

Individual components represented by the blocks shown in FIG. 1 are well known in the lens metering art and their specific construction and operation is not critical to the invention or the best mode for carrying out the invention. Moreover, the operations discussed in the specification are better performed by the signal processor 8 which can be easily programmed into well signal processors by person of ordinary skill in the art and since such programming per se is not part of the invention, no further description thereof is deemed necessary.

While the present invention has been described with respect to what is presently considered to be the preferred embodiments, it is understood that the invention is not limited to the disclosed embodiments. The present invention is intended to cover various modifications within the spirit and scope of the appended claims.

What is claimed is:

1. An automatic lens meter comprising:
    a projection optical system for projecting at least one light beam onto a lens to be tested, said lens held at a predetermined position in the direction of an optical axis;
    a receiving optical system comprising a light position detector, said receiving optical system receiving light beams related to said at least one light beam and transmitted through the lens to be tested on said light-position detector;
    calculation means for calculating a diopter value and an eccentricity of the lens to be tested from the position of the transmitted light beams on said light-position detector;
    time measuring means for measuring the time during which said eccentricity is within a predetermined range; and display means for displaying said diopter value of the lens to be tested when the time during which the eccentricity is within a predetermined range exceeds a predetermined time.

2. An automatic lens meter according to claim 1, wherein said calculation means calculates a plurality of measured data for each of the diopter values and the eccentricity of the lens to be tested, and wherein said display means displays an average value of said plurality of measured data.

3. An automatic lens meter according to claim 1, wherein said calculation means calculates a plurality of measured data for the eccentricity of the lens to be tested, and a single measured data for the diopter value of the lens to be tested when the time during which the eccentricity is within a predetermined range exceeds said predetermined time, and wherein said display means displays the calculated diopter value.

4. An automatic lens meter according to claim 1, further comprising means for indicating to an operator the completion of the measurement.

5. An automatic lens meter according to claim 4, wherein said indicating means comprises sound generation means for generating a sound.

6. An automatic lens meter according to claim 1, wherein said lens to be tested comprises a progressive multifocal lens.

7. An automatic lens meter according to claim 6, wherein said calculation means calculates at least one of a difference in astigmatism and a deviation from a toric between a far-sight position and a near-sight position of said progressive multifocal lens.

8. An automatic lens meter according to claim 1, further comprising a switch connected to said calculation means, wherein when said switch is closed said calculation means starts calculating the diopter value of the lens to be tested when the time during which the eccentricity is within a predetermined range does not reach said predetermined time.

9. An automatic lens meter according to claim 1, wherein said calculation means calculates the eccentricity and the diopter value based on light beams from the same light source.

10. An automatic lens meter comprising:
a projection optical system for projecting at least one light beam onto a lens to be tested, said lens held at a predetermined position in the direction of an optical axis;
a receiving optical system comprising a light position detector, said receiving optical system receiving light beams related to said at least one light beam and transmitted through the lens to be tested on said light-position detector;
calculation means for calculating a diopter value and an eccentricity of the lens to be tested from the position of the transmitted light beams on said light-position detector;
time measuring means for measuring the time during which said eccentricity is within a predetermined range; and
register means for registering said diopter value of the lens to be tested when the time during which the eccentricity is within a predetermined range exceeds a predetermined time.

11. An automatic lens meter according to claim 10, wherein said projection optical system projects an expanded light beam as said at least one light beam, and said receiving optical system includes a diaphragm disposed between the lens to be tested held at a predetermined position and said light position detector, said diaphragm having a plurality of apertures for selecting said light beams from said expanded light beam transmitted through the lens to be tested.

* * * * *